L. A. CARPENTER & R. MIDDLETON.
BREAD MIXER.
APPLICATION FILED JUNE 9, 1915.
1,196,931.
Patented Sept. 5, 1916.
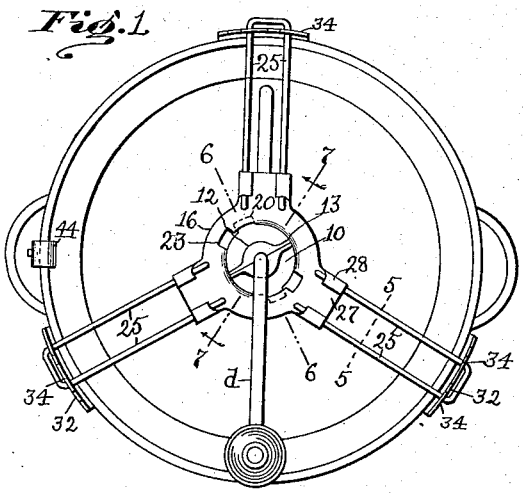
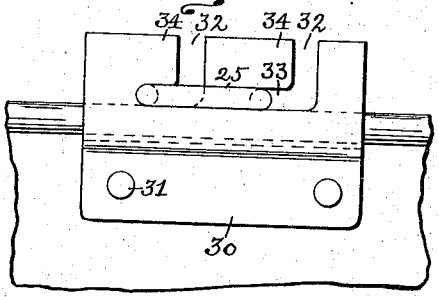
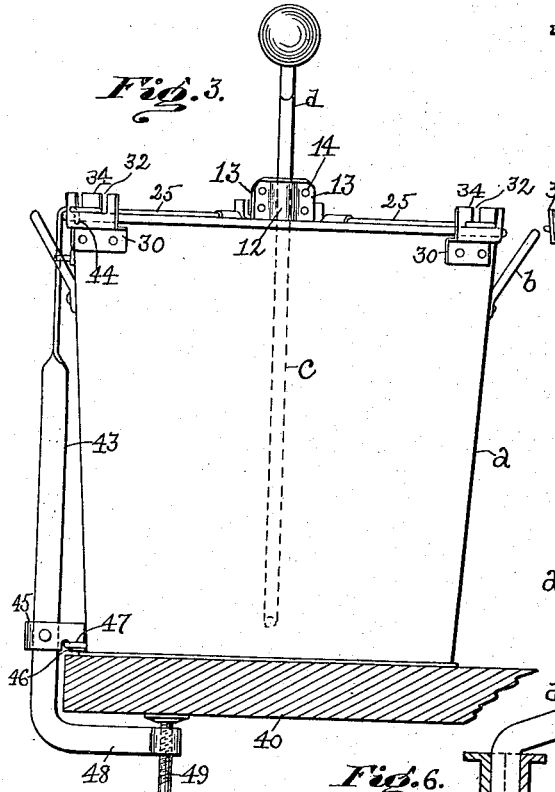
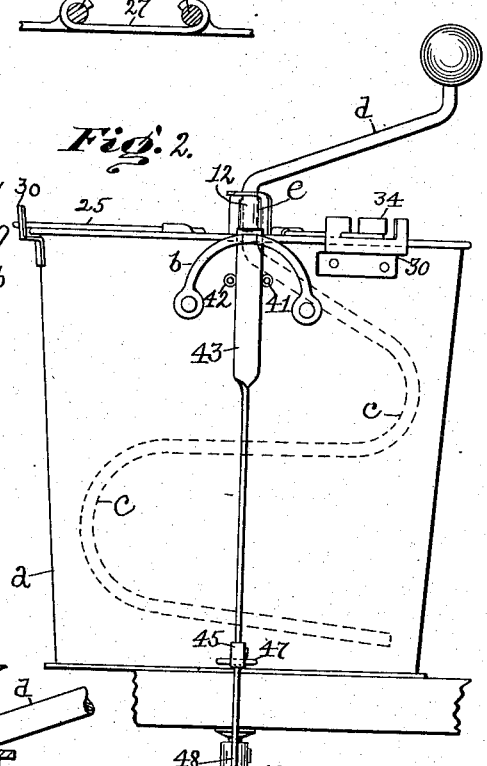
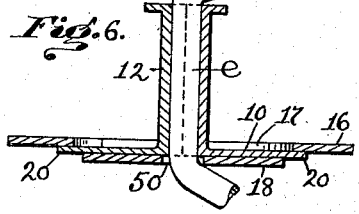
Witnesses:
Inventors
Lewis A. Carpenter
Richard Middleton
by Jas. H. Churchill
Atty.

UNITED STATES PATENT OFFICE.

LEWIS A. CARPENTER AND RICHARD MIDDLETON, OF REVERE, MASSACHUSETTS.

BREAD-MIXER.

1,196,931.　　　　　Specification of Letters Patent.　　Patented Sept. 5, 1916.

Application filed June 9, 1915. Serial No. 33,176.

*To all whom it may concern:*

Be it known that we, LEWIS A. CARPENTER and RICHARD MIDDLETON, citizens of the United States, residing in Revere, in the county of Suffolk and State of Massachusetts, have invented an Improvement in Bread-Mixers, of which the following description, in connection with the accompanying drawings, is a specification, like characters on the drawings representing like parts.

This invention relates to a beating or mixing apparatus and is herein shown as embodied in an apparatus especially designed and adapted for mixing bread.

The invention has for its object to provide an efficient, durable, simple and inexpensive apparatus for the purpose specified.

The particular features of this invention will be pointed out in the claims at the end of this specification.

Figure 1 is a plan, and Figs. 2 and 3, elevations of a bread mixer embodying this invention. Fig. 4, a detail in elevation on an enlarged scale to be referred to. Fig. 5, a section on the line 5—5, Fig. 1, Fig. 6, a section on the line 6—6, Fig. 1, and Fig. 7, a section on the line 7—7, Fig. 1.

Referring to the drawing, $a$ represents a vessel for containing the material to be stirred or agitated, which material will be referred to as dough. The vessel $a$ is preferably made of sheet metal and is open at its upper end and closed at its bottom and may and preferably will be provided with handles $b$. The vessel $a$ is designed to receive a rotatable mixing device or beater, preferably made as herein shown and consisting of a metal rod having a bent lower portion $c$, an inclined upper portion $d$ forming a handle, and a straight intermediate portion $e$ (see Fig. 6), which latter forms a rotatable shaft and is supported in a bearing member, which is detachably secured to a supporting frame or member, as will be described.

The bearing member referred to is preferably made as herein shown and consists of a circular disk 10 and a hub 12 having side flanges 13, which parts are made in two pieces of sheet metal and firmly secured together by rivets 14 or otherwise (see Fig. 3), which are extended through the side flanges 13. The supporting frame or member referred to, consists of a sheet metal disk 16 having a circular depression or recess 17, whose bottom 18 is located below the level of the disk 16 a distance substantially equal to the thickness of the disk 10, (see Fig. 6), so that the disk 10 may rest upon the bottom 18 and have lugs or ears 20 on the disk 10 extended under the disk 16 to lock the bearing member to the supporting member. The disk 16 is provided on its inner circumference with slots 23 from which extend circular slots 24 in the circumferential wall of the recess 17, (see Fig. 7), with which coöperate the lugs 20 to engage the disk 10 with the disk 16. The disk 16 is supported by the circumferential wall of the vessel $a$, which may be accomplished as herein shown by radial arms 25, herein shown as three in number and each made of a wire rod, which is bent at its middle to form substantially parallel members, whose free ends are attached to radial arms 27 on the sheet metal disk 16, by lugs or ears 28 on the sheet metal arms 27, which are bent over upon the members of the radial arms to firmly clamp them to the sheet metal arms 27.

The substantially parallel members of the arms 25 coöperate with anchoring devices for securing the supporting frame to the vessel $a$. The anchoring devices referred to, consist as herein shown of sheet metal lugs or ears 30, which are fastened by rivets 31 or otherwise to the body portion of the vessel $a$, and are extended above the rim of the vessel and provided with angle slots having substantially vertical portions 32 and horizontal portions 33 (see Fig. 4), which latter form locking fingers 34, with which the members of the arms 25 engage to fasten the said arms to the ears against vertical movement, and thereby secure the frame which supports the rotatable beater or stirrer $c$ in fixed relation to the vessel.

The ears 30 are secured to the vessel $a$ so that the horizontal portions 33 of the slots extend away from the vertical portions in a clockwise direction, so that when the handle $d$ is turned clockwise, any rotary or turning movement imparted to the beater supporting frame, serves to keep the latter in its anchored position. Furthermore the slots 24 in the vertical wall of the recess or depression 17 in the disk 16 also extends clockwise, so as to insure the lugs 20 being maintained in their locking position with relation to the disk 16. Provision is also made for securing the vessel $a$ in a fixed position on a table, bench or other support 40, and to this end the said vessel is provided on its outer side near its upper end with pins 41, 42, (see Fig.

2), which are spaced apart for the reception between them of the upper portion of a metal bar 43, which is provided at its upper end with a bent portion or hook 44 to engage the rim of the vessel a, and which has secured to it near its lower portion an arm 45 provided with a finger 46, which forms a hook to engage a bail 47 attached to the vessel a near the bottom of the latter (see Fig. 3). The bar 43 is provided at its lower end with an arm 48, which is designed to extend under the table or other support 40 and is provided with a threaded opening which is engaged by a screw 49 for clamping the vessel a firmly to the table.

The bar 43 is twisted between its ends so that its upper portion is substantially at right angles to its lower portion, with the width of the upper portion presented to the vessel substantially parallel to the side thereof and with the lower portion presented edge on to the vessel. The finger 46 coöperates with the bail 47 to prevent the vessel moving away from the edge of the table as the pressure of the holding bar 43 is applied to the rim of the vessel, which it would be liable to do if the bail and finger were omitted, on account of the side of the vessel being inclined.

The clamping device or holding bar 43 can be quickly and easily applied to the vessel a and the latter secured in fixed relation to the table in a minimum time.

The center disk 10 being detachable from the supporting frame enables a long bearing to be made for the shaft e, and further enables the rotary beater to be readily cleaned. It also facilitates packing and shipping of the apparatus.

In assembling the apparatus for use, the vessel is clamped to the table as described and the flour placed therein. The supporting frame is then applied to the vessel by passing the members of the arms 25 down through the vertical slots 32 in the ears 30, and then the disk 10 is given a turn in a clockwise direction to enter the arms 25 into the slots 33, which brings the members of the said arms under the retaining fingers 34. The beater is then inserted into the vessel a through the circular opening 50 in the bottom of the recess 17, and the disk 10 is arranged with its lugs 20 in line with the slots 23 in the disk 16, and when thus positioned the disk 10 is lowered onto the bottom wall 18 and then given a clockwise turn to carry the lugs 20 into the slots 24, as represented in Fig. 1. The apparatus is now ready for use for mixing up the contents of the vessel by turning the handle in the usual clockwise direction.

It will be observed that the bearing hub 12 for the shaft c is made in two pieces, which are fastened together, which construction enables the bearing to be applied after the beater rod has been bent.

Claims.

1. In an apparatus of the character described, in combination, a vessel open at its top and provided with a plurality of ears extended above the rim of the vessel and having slots provided with substantially vertical and horizontal portions, a supporting frame having a disk provided with a depression or recess and with a slot in the circumferential wall of said recess, arms attached to said disk and capable of entering the slots in said ears to secure the supporting frame to the vessel, a central disk located in the recess in the disk of said frame and provided with a lug to enter the slot in the circumferential wall of said recess, a bearing hub extended from said central disk, and a shaft rotatable in said hub and having a portion extended into said vessel.

2. In an apparatus of the character described, in combination, a vessel open at its top and provided with lugs or ears having vertical and horizontal slots in them, a supporting frame extended across the open top of said vessel and provided with radial arms to enter said slots and secure said frame to said vessel, and a shaft rotatably mounted on said frame and extended into said vessel.

3. In an apparatus of the character described, in combination, a vessel open at its top, a supporting frame detachably secured to said vessel and provided with a substantially central recess having a slot in its circumferential wall, a disk located in said recess and provided with a lug to enter the slot in said circumferential wall and detachably secure said disk to said frame, a bearing hub attached to said disk, and a shaft rotatable in said bearing hub and extended into said vessel.

In testimony whereof, we have signed our names to this specification in the presence of two subscribing witnesses.

LEWIS A. CARPENTER.
RICHARD MIDDLETON.

Witnesses:
 JAS. H. CHURCHILL,
 J. MURPHY.